United States Patent [19]

Kervin

[11] 4,150,684

[45] Apr. 24, 1979

[54] MIXING VALVE AND CONTROL SYSTEM THEREFOR

[76] Inventor: Willis D. Kervin, P.O. Box 5357 EKS, Johnson City, Tenn. 37601

[21] Appl. No.: 762,275

[22] Filed: Jan. 25, 1977

[51] Int. Cl.² ............................................. G05D 11/03
[52] U.S. Cl. .................................. 137/111; 137/595; 137/613; 137/606
[58] Field of Search ................. 137/606, 594, 595, 88, 137/90, 111, 118, 613; 251/212

[56] References Cited

U.S. PATENT DOCUMENTS

| | | | |
|---|---|---|---|
| 1,077,881 | 11/1913 | Higgins | 137/606 |
| 1,530,858 | 3/1925 | Shaw | 137/595 |
| 2,032,641 | 3/1936 | Thomas | 137/88 |
| 2,097,397 | 10/1937 | Heinrich | 137/595 |
| 2,332,995 | 10/1943 | Eaton | 137/90 |
| 2,486,017 | 10/1949 | Furkert | 137/88 |
| 2,633,859 | 4/1953 | Klosse | 137/88 |
| 3,521,663 | 7/1970 | Brinkerhoff et al. | 251/212 |
| 3,621,878 | 11/1971 | Smith | 137/595 |
| 3,635,252 | 1/1972 | Botnick | 137/606 |
| 3,809,109 | 5/1974 | Breiling et al. | 137/88 |

*Primary Examiner*—Martin P. Schwadron
*Assistant Examiner*—H. Jay Spiegel

*Attorney, Agent, or Firm*—Sewall P. Bronstein; Robert T. Gammons

[57] ABSTRACT

A mixing valve comprising a rigid structure containing an interior recess and inlet and discharge ports in communication therewith, and weir plates and a slide plate confined in the recess for movement of the weir plates transversely of the recess with respect to the ports and for movement of the slide plate longitudinally of the recess with respect to the ports, said weir plates and slide plate containing openings which in predetermined positions of the plates are aligned in exact registration with the ports, and which can be moved relative to each other and to the ports to vary both the ratio of the fluids to be mixed to each other and the total flow of the fluids through the mixing valve. The fluids to be mixed are delivered to the inlet ports through conductors and the mixed fluids are delivered from the discharge ports through conductors to a mixing chamber and there are pneumatically operable flow control valves, a control circuit for controlling operation of the pneumatically operable flow control valves and a starting circuit operable in the event that the pressure of the fluids to be mixed is below a predetermined set pressure to disable the control circuit.

24 Claims, 6 Drawing Figures

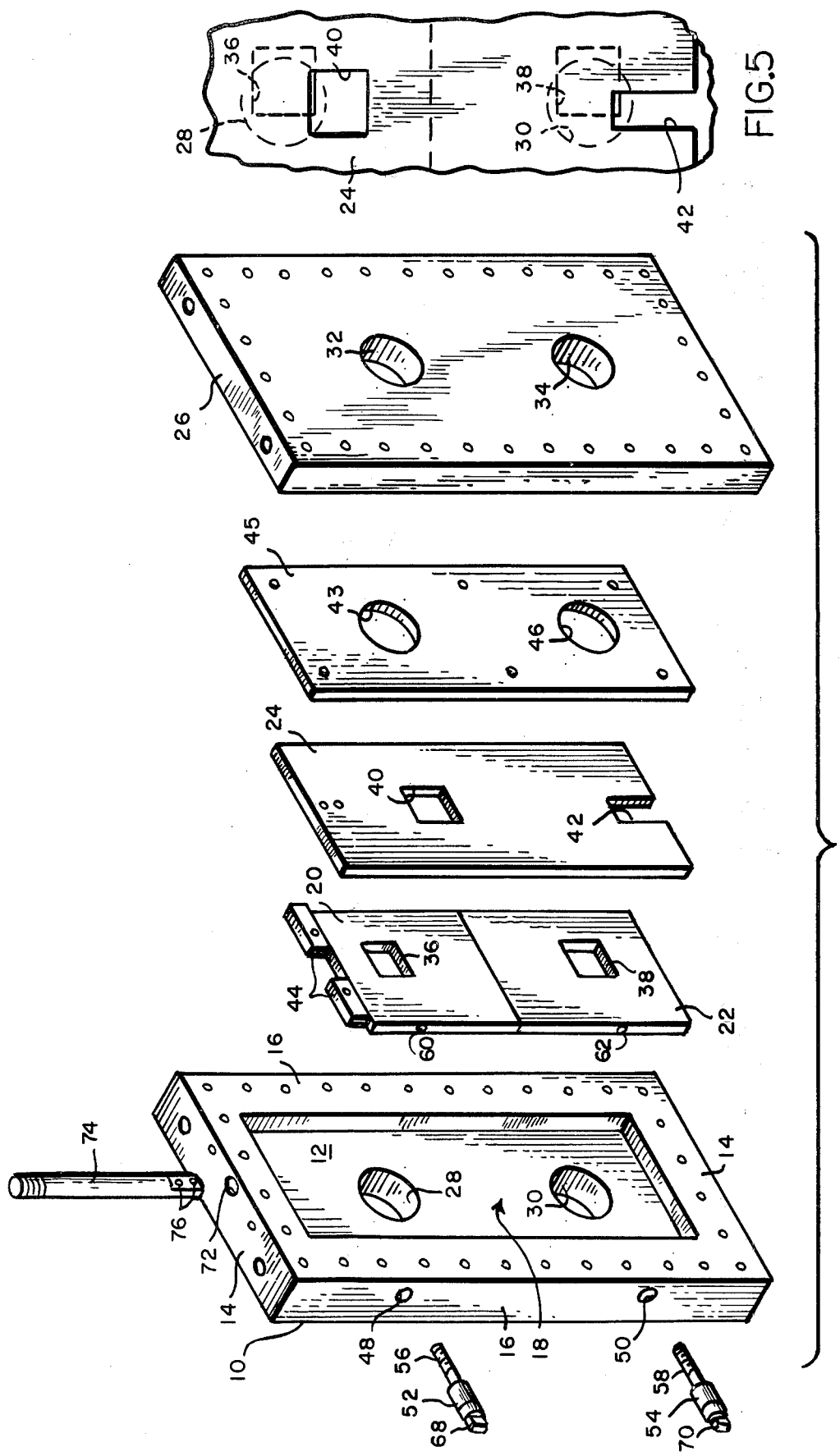

MIXING VALVE AND CONTROL SYSTEM THEREFOR

BACKGROUND OF INVENTION

The art is replete with mixing valves and control systems therefor of varying degrees of efficiency and complexity. Most such valves and controls depend upon outside sources of electrical power for their operation, require the presence of and close attention of operating personnel, and are only as efficient as is within the capabilities and skill of the personnel attending to their operation. The mixing valve and control system herein illustrated is designed to provide a combination of improvements in the construction and operation of mixing valves and the controls therefor which is not available in any known mixing valve, to wit, to provide a mixing valve which will be self-contained by employing one of the fluids to be mixed for controlling the system and to make operation of the system dependent on the presence of the other fluid; to provide for making adjustments at a location remote from the place of mixing so that the operator will not have to be present in the room where mixing is accomplished; to provide for varying the volume of flow and ratio of the fluids being mixed within the confines of a unit structure; to provide for making such changes while the system is in operation; and to provide a fail-safe system wherein the pressures of the fluids to be mixed must be at a predetermined set pressure before operation of the system can be initiated.

SUMMARY OF INVENTION

The mixing valve comprises a rigid body containing an interior recess and inlet and outlet ports in communication therewith within which there are proportioning means and flow control means. The proportioning means comprise flat weir plates corresponding in number to the number of fluids to be mixed stacked one above another in a common plane adjacent the side of the recess containing the inlet ports, each containing an opening and the flow control means comprises a single flat slide plate supported against the weir plates containing openings corresponding in number to the openings in the weir plates. The weir plates are narrower than the recess and the slide plate shorter than the recess and there is means for moving the weir plates individually transversely of the recess relative to each other and to the slide plate and means for moving the slide plate longitudinally of the recess relative to the weir plates. The openings in the weir plates and the openings in the slide plate are so positioned that when the weir plates are moved to a predetermined position at one side of the recess and the slide plate moved to a predetermined position at the top of the recess, the openings in the weir plates and the slide plates are exactly aligned with the inlet and outlet ports, thus providing for proportional flow of the fluids and for maximum flow through the mixing valve. Adjustment of the weir plates relative to each other and to the slide plate provide for varying the ratio of the fluids and the total flow. There are conductors connected to the inlet ports for supplying the fluids to be mixed to the mixing valve and conductors connected to the outlet ports for delivering the mixed fluids to a mixing chamber. Pneumatically operable valve means are provided in the conductors connected to the inlet ports for controlling flow through the conductors to the mixing valve, and pneumatically operable means is connected to the slide plate for controlling the position thereof. A control circuit is provided for effecting operation of the pneumatically operable means and a starting circuit is provided operable by the presence of one of the fluids in the conductors at a predetermined set pressure to provide operating pressure to the control circuit which will enable the starting circuit in the event that the fluids in the conductor means are present at a predetermined set pressure. There is also means in the control circuit for adjusting the set point of operation of the pneumatically operable means and, hence, the pressure of the fluids at the downstream sides of the pneumatically operable means and for adjusting the position of the slide plate. The pneumatically operable means in the conductors are fluid controlled valves and there are means connecting them to the control circuit operable in the event that the operating pressure in the circuit is cut off by the starting circuit to close these valves.

The invention will now be described with reference to the accompanying drawings, wherein:

FIG. 1 is an exploded isometric view showing the component parts of the mixing valve;

FIG. 5 is a fragmentary elevation showing the position of the weir plates and slide plate at minimum flow.

Figure 2:
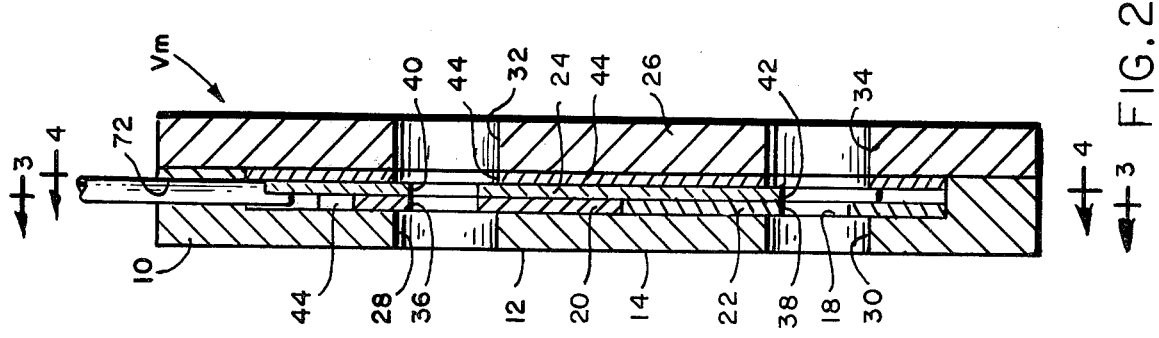
FIG. 2 is a vertical section through the assembled mixing valve.

The mixed valve $V_m$ as shown in FIGS. 1 and 2 is of substantially rectangular vertical and horizontal cross section and comprises a rigid body 10 having a back wall 12, top and bottom walls 14—14 and side walls 16—16 which define, in conjunction with the back wall, a substantially rectangular recess 17 open at the front side for receiving weir plates 20 and 22 and a slide plate 24 which are confined in the recess by a cover plate 26 bolted to the walls 14—14 of the structure over the recess 18.

The back wall 12 of the body 10 and the cover plate 26 are provided with inlet ports 28 and 30 which give access to the recess 18 and outlet ports 32 and 34 from the recess, the ports 28 and 32 and 30 and 34 being in horizontal alignment and located midway between the side walls of the structure. These ports may be threaded to receive conductors for delivering the fluids to be mixed to the mixing valve through the inlet ports 28 and 30 and conductors for discharging the mixed fluids as proportioned by the mixing valve through the ports 32 and 34 to a mixing chamber.

There are two weir plates 20 and 22, each of which is of rectangular configuration and each of which contains a rectangular opening—an opening 36 in the upper weir plate and an opening 38 in the lower weir plate. The weir plates 20 and 22 are set into the recess 18, one above the other, against the back wall 12, FIG. 2, with the upper weir plate 20 resting on the lower weir plate. A pair of weir holders 44—44 are bolted to the inside of the back wall 12 at the upper end of the recess of such dimensions as to hold the weir plates firmly against the lower end of the recess, but to permit the weir plates which are narrower than the recess is wide to be moved transversely within the recess relative to each other and to the side walls 16—16. The openings 36, 38 in the weir plates are so located therein that when the weir plates are engaged with the left-hand side wall 16, these openings are in exact alignment with the inlet ports 28 and 30, FIG. 3.

The slide plate 24 is mounted within the recess against the weir plates and corresponds in width to the recess so that it is not laterally movable therein, but is shorter in length than the length of the recess from top to bottom so that it can be moved longitudinally therein. The slide plate contains rectangular openings 40 and 42 so located that when the slide plate is moved to its uppermost position with its upper end engaged with the upper wall 14, the openings 40 and 42 are in exact alignment with the inlet ports, the outlet ports and the openings 36 and 38 of the weir plates, if the latter are in the positions of alignment with the inlet ports, FIG. 4.

The cover plate 26 has bolted to its inner side a recess plate 45 which is of rectangular configuration corresponding to that of the recess 18 so that when the cover plate is applied to close the recess, the recess plate fits into the recess against the slide plate and retains the latter therein in sliding engagement with the weir plates. The recess plate 45 contains circular openings 43 and 46 which are concentric with the ports 32 and 34 in the cover plate.

Figure 4:
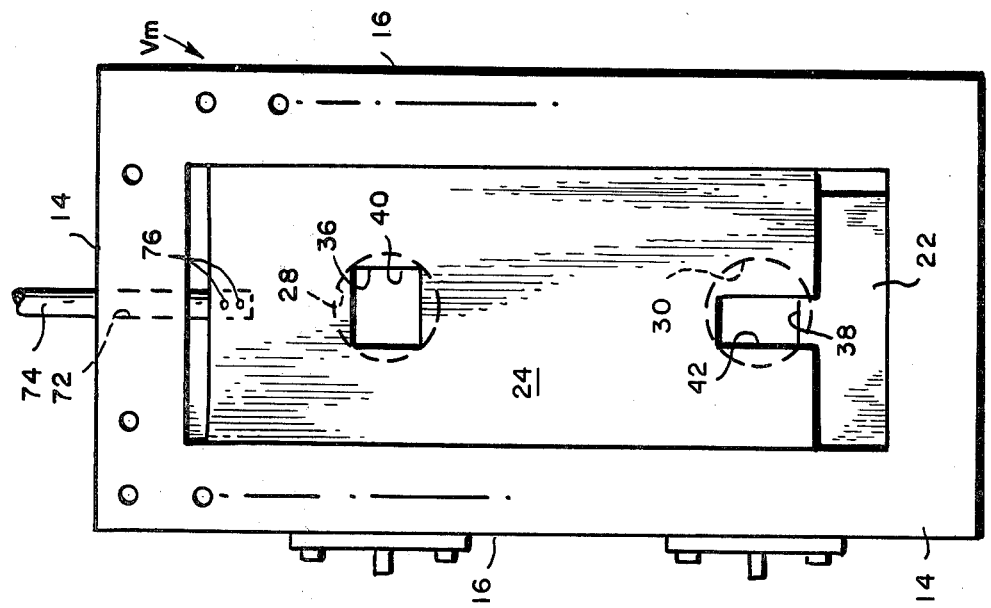
FIG. 4 is an elevation taken on the line 4—4 of FIG. 2.
Figure 3:
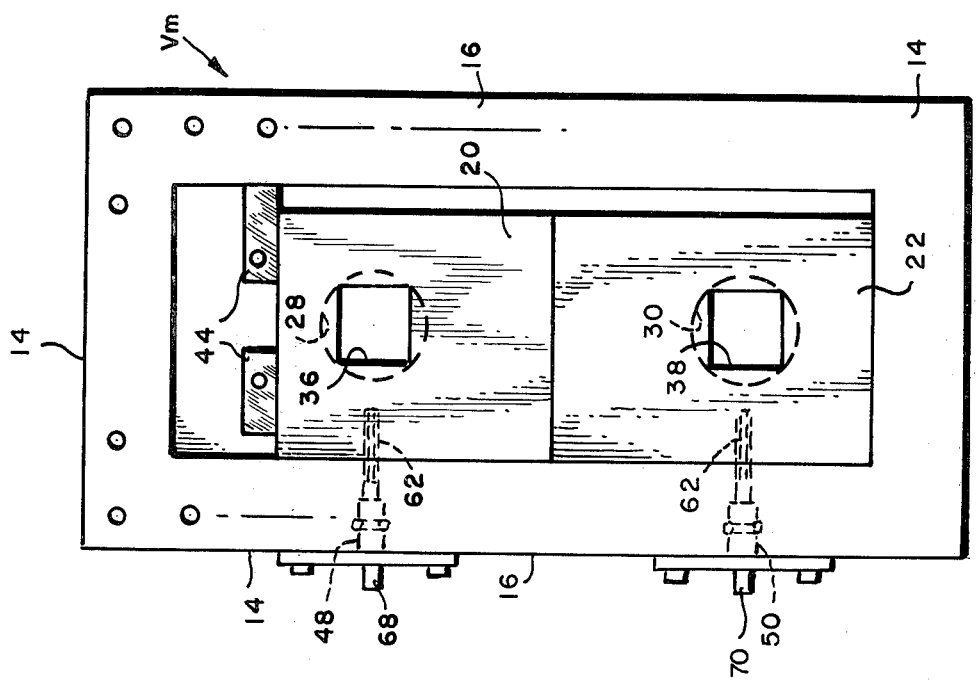
FIG. 3 is an elevation taken on the line 3—3 of FIG. 2.

At one side of the body 10, the left side, as shown in FIGS. 1, 3 and 4, there are openings 48 and 50 through the side wall 16 in which are rotatably mounted adjusting screws 52 and 54 having at their inner ends threads 56 and 58 which are threaded into openings 60 and 62 in the edges of the respective weir plates 20 and 22 and at their outer ends heads 68 and 70 by means of which they may be rotated to move the weir plates transversely within the recess. Rotation of the adjustment screws in a clockwise direction will draw the weir plates to the left within the recess while counterclockwise rotation will shift the weir plates to the right in the recess.

A hole 72 is provided in the top wall 14 of the recess for receiving a rod 74, the inner end of which is provided with openings 76 by means of which it is bolted to the upper end of the slide plate 24 and the outer end of which is threaded for connection to means for effecting vertical movement thereof and, hence, vertical movement of the slide plate within the recess.

When the weir plates 20 and 22 are moved by their respective adjusting screws 52 and 54 to the left side of the recess in the body and the slide plate 24 is moved to the top of the recess, as heretofore related, the upper port 28 in the back wall, the square opening 36 in the weir plate 20, the square opening 40 in the top of the slide plate, the circular hole 43 in the top of the recess plate and the upper port 32 in the cover plate are aligned to form a passageway through the mixing valve for one of the fluids to be mixed. Also in this position, the bottom port 30 in the back wall, the square opening 38 in the lower weir plate 22, the opening 42 at the bottom of the slide plate 24, the bottom opening 46 in the recess plate, and the discharge port 34 in the cover plate are aligned to form a passageway through the valve for the other of the fluids to be mixed. In the aforesaid position of the component parts of the structure, the square opening 40 in the top of the slide plate 24 and the square opening 36 in the upper weir plate are in exact alignment, FIG. 4, and the square opening 38 in the lower weir plate is in exact alignment with the opening 42 in the slide plate.

The flow of a fluid through an opening is in direct proportion to the area of the opening through which it flows. Accordingly, if the slide plate 24 is lowered a small amount, the area and thus the flow of both fluids entering through the inlet ports is decreased by equal amounts. This enables varying the total flow through the valve.

The mixing valve illustrated herein is for mixing propane gas and air and conductors are provided to deliver the propane gas to the inlet port 28 and air to the inlet port 30. Accordingly, if the weir plate 20 is moved toward the right side of the body by its adjustment screw while the lower weir plate 22 and slide plate 24 are held stationary, the area of the propane port is decreased which will, in turn, decrease the propane flow, but will not change the air flow since the area of its port has not changed. A change in the position of the upper weir plate 20 in the other direction will result in an increase in the area of the propane port, thus increasing the flow of the propane vapor while the flow of the air remains constant. If the lower weir plate 22 is moved toward the right side of the recess in the body, while the upper weir plate 20 and slide plate 24 remains stationary, the area of the air port will be decreased, thus reducing the flow of air through it, but without changing the flow of the propane. This, in turn, will change the ratio of propane to air. A further movement of the lower weir plate 22 toward the right will result in a further decrease in the area of the air port, thus reducing the volume of the air flow further. This will again change the ratio of the propane flow to the air flow. A reversal of the movement of the lower weir plate 22 will increase the flow of air and will change the ratio of propane flow to air flow. It is thus apparent that the ratio of the propane flow to the air flow can be manually set by the proper horizontal positioning of the weir plates 20, 24 and that the total flow of both fluids can be varied by varying the vertical position of the slide plate 24 while the ratio of the fluids will remain constant.

The valve has been designed, and as described herein, for mixing two fluids, namely, propane vapor and air, to produce a mixture of propane and air. By increasing the size of the recess 18 to receive an additional weir plate and a longer slide plate with matching openings, another fluid could be proportioned simultaneously and this could be continued for additional fluids as long as practical from the standpoint of cost and size.

Since the flow of fluid through an orifice or port is a function of the pressure, it is necessary to maintain the pressure of each fluid at the inlet port of the mixing valve at some predetermined value. It is also necessary to insure that both the incoming air and propane reach the inlet ports of the mixing valve at a proper pressure. To accomplish this, a control circuit A and a starting circuit B are provided as shown diagrammatically in FIG. 6 for supplying the propane gas, one of the two component fluids to be mixed, to the mixing valve through a shutoff valve 100, check valve 102 and conductor 104 to the inlet port 28 of the mixing valve while air, the other component of the fluids to be mixed, is supplied to the mixing valve through a shutoff valve 106, a check valve 108, and conductor 110 to the inlet port 30 of the mixing valve.

Figure 6:
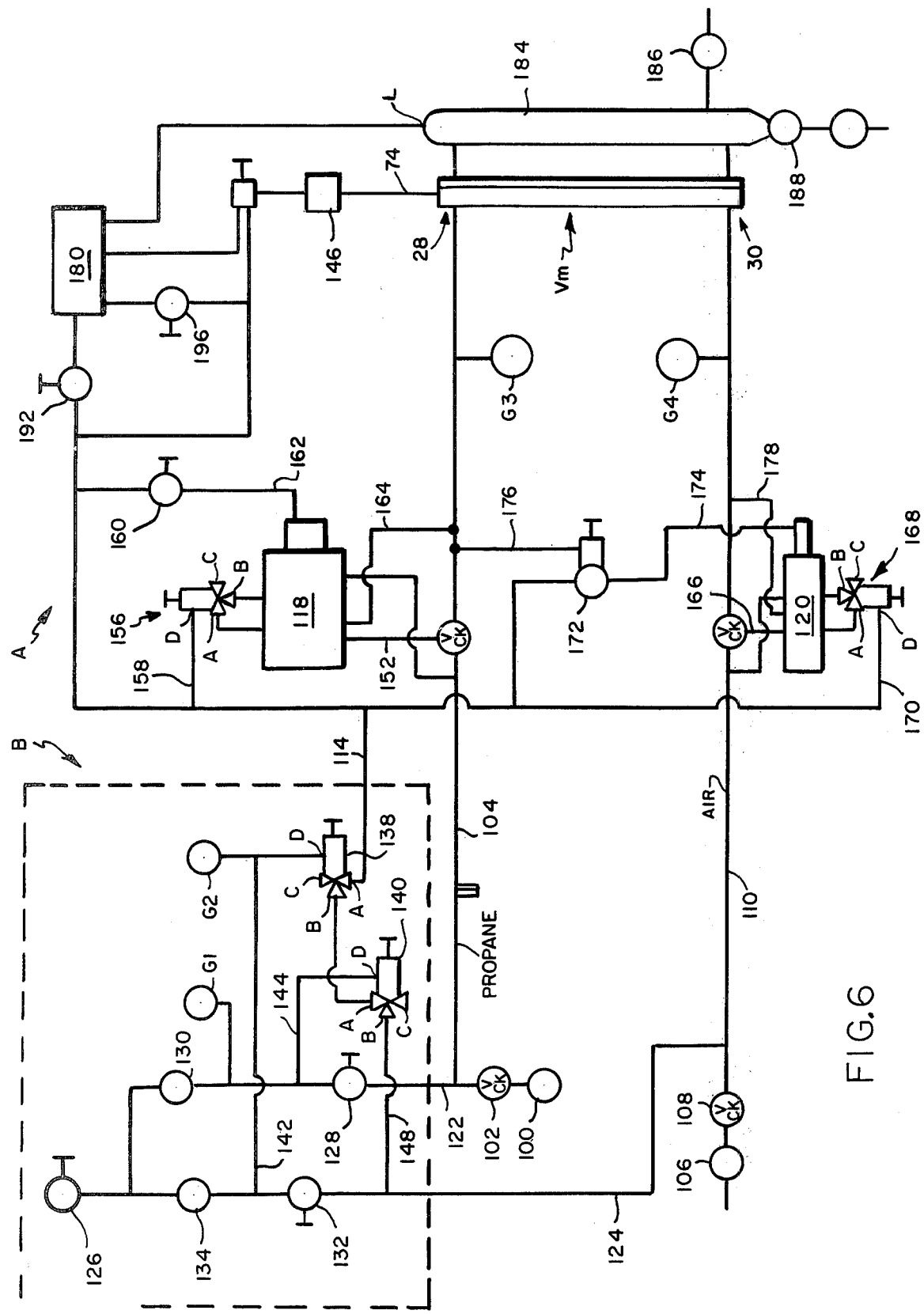
FIG. 6 diagrammatically shows the control circuit and starting circuit, for supplying the fluids to be mixed to the mixing valve and the mixing chamber to which the mixed fluids are delivered.

The starting circuit B encompassed within the dot and dash rectangle at the upper left end of FIG. 6 includes failsafe means and is designed to supply control air from the conductor 110 through a conductor 114 to the control circuit A which includes pneumatically operable regulators 118 and 120 interposed in the respective conductors 104 and 110 through which the propane and air are fed to the mixing valve.

Referring to the circuit B, a conductor 122 is connected to the conductor 104 at the downstream side of the check valve 102 and a conductor 124 is connected to the conductor 110 at the downstream side of the check valve 108. The two conductors 122 and 124 are connected to a common normally open pushbutton valve 126 which constitutes a starting button. A needle valve 128 in the conductor 122 feeds propane pressure from the conductor 122 to a pressure regulator 130 (a Fisher No. 7) located in the conductor 122. The needle valve 128 is adjusted to allow only a small amount of propane to flow through it to the pressure regulator 130 and as long as the propane pressure at the inlet of the pressure regulator 130 is below a set point, in this case, 85 pounds per square inch, the pressure regulator 130 will remain open and bleed the propane through it to the atmosphere through the normally open pushbutton valve 126. A needle valve 132 in the conductor 124 feeds air pressure from the conductor 124 to a pressure regulator 134 (also a Fisher No. 67) and as long as the pressure at the inlet side of the pressure regulator 134 is below the set point of 85 pounds per square inch, the latter will remain open so that the air will flow along with the propane through the normally open pushbutton valve 126 (Bellows-Valvair Pushbutton). If the normally open pushbutton valve 126 is depressed and held, the propane pressure and air pressure will increase at the inlets of their respective pressure regulators 130 and 134 until it reaches the same pressure as the pressures at the downstream sides of the check valves 102 and 108. If this pressure corresponds to the set pressure, control pressure from the air conductor 110 will be supplied through the circuit B and conductor 114 to the control circuit A and, hence, to the pneumatically operable regulator means 118, 120, as will appear hereinafter. If the propane pressure at the regulator valve 130 is above the set point, the regulator valve 130 will shift to its closed position and become locked at that position. The pressure at the regulator valve 130, when the latter is closed, will shift a lockout relay 138 (a Fisher No. 164A) from a closed to an open position. Correspondingly, if the air pressure at the regulator 134 is above the set point, the regulator valve 134 will close and become locked and the pressure at this regulator valve will shift a relay lockout 140 (also a Fisher No. 164A) from a closed to an open position. When both of the relays 138 and 140 have been thus closed, they will permit air from the conductor 124 to pass through to the conductor 114 and from thence to the control circuit A so as to effect operation of the pneumatically operable regulator 118, 120 and pneumatically operable means 146 connected to the rod 74 which controls the position of the slide plate. The path of the control air, when the regulator valves 130 and 134 are closed and the lockout relays 138 and 140 have been shifted, is from conductor 110 through conductor 124, conductor 148 to port B of relay 140 out port A of said relay to the inlet port B of relay 138 and out port A of the relay 138 through the conductor 114. If the pressure in the propane conductor 104 should fall below the set point, the regulator valve 130 in the conductor 122 will open, thus allowing the relay 138 to shift to vent the control air through the port C to the atmosphere. If the air pressure falls below the set point in the conductor 124, the regulator valve 134 will automatically open so that the relay 140 will now shift to vent the control air from the conductor 124 through the port C. As shown, the conductors 122 and 124 are connected to the downstream sides of the shutoff valves 100 and 106 to prevent the operator from trying to operate the system without both valves being completely open.

The pneumatically operable regulator means 118, 120 for regulating the air pressure and propane pressure to the ports of the mixing valve are diaphragm-operated valves (Fisher Model 99 regulators with 61H pilots) modified by removing the pressure setting springs from the pilots and using the control pressure from the control circuit to set the controlling pressure of the regulators. The pneumatically operable regulator valve means 118 is connected by a conductor 152 to the conductor 104 and within the valve there is a pilot which supplies the pressure from the conductor 152 to one side of the diaphragm by means of which the regulator valve is opened and closed. Opening of the valve will permit pressure to flow through it. A relay 156 (a Fisher 164A relay) connected by a conductor 158 to the control circuit is operable by the pressure in the control circuit when the latter is supplied with pressure at a predetermined set pressure from the starting circuit to permit the pilot pressure to flow to one side of the diaphragm. A high precision regulator 160 (Fairchild 30) connected to the control circuit is adapted to be adjusted to feed control pressure through a conductor 162 to the opposite side of the diaphragm in the regulator valve 118 at a pressure to overcome the pressure delivered to the one side, thus to open the regulator valve 118 to said predetermined set pressure. Propane will then flow through the regulator valve 118 to the propane port 28 of the mixing valve. This flow will continue until the pressure in the conductor 104 at the downstream side of the regulator valve 118 reaches a pressure corresponding to that for which the regulator 160 is set as sensed through a conductor 164 connected at one end to the conductor 104 and at its other end to the regulator valve 118.

The pneumatically operable regulator valve 120 is correspondingly connected to the conductor 110 by means of a conductor 166 and is provided with a relay 168 connected by a conductor 170 to the control circuit. A set point regulator 172 (a Fairchild Model 14 biasing regulator) connected by a conductor 174 to the regulator valve 120 is automatically operable in response to the pressure developed in the propane conductor 104 to be opened, thus providing pilot pressure to the regulator valve 120. Automatic opening of the regulator 172 is effected by pressure delivered to it through a conductor 176 which connects it to the conductor 104. A conductor 178 connects the regulator valve 120 to the conductor 110 and by adjusting the regulator 172, the air pressure can be adjusted to be equal to the propane vapor pressure.

During this time, the mixing valve $V_m$ has been opened slightly by the action of a pressure controller 180 (Fisher 415) connected to the control circuit and to the pneumatically operable means 146 (a Foxboro P110 air lift) so that propane and air will flow through the mixing valve $V_m$ to a mixing chamber 184. At the lower end of the mixing chamber, there is a stack valve 186 which is open to the atmosphere which allows a small amount of the mixture to flow out to the atmosphere while the regulator valves 118 and 120 are being adjusted to provide the proper pressures, and the weir plates in the mixing valve are being adjusted for the proper ratio of propane flow to air flow. When these adjustments are completed, the stack valve 186 is closed and a valve 188 in communication with the mixing chamber is opened to allow the propane-air mixture to flow to a distributing system. To change the propane pressure and air pressure, the propane set regulator valve 160 is adjusted. To change the flow, a flow limit regulator valve 196 is adjusted. If a change in the outlet pressure from the system as sensed at L is needed or desired, a remote, manually operable pressure regulator 192 (Fairchild 30) is provided.

The advantages of this system are a completely pneumatic safety system wherein the incoming pressures are sensed to insure that sufficient pressure is present before startup can be attempted; a system in which propane vapor pressure must be present before air can be introduced into the system so that the air pressure is always governed by the presence of the propane vapor pressure; a system in which no electrical power is required for its operation, thus making it completely independent for operation upon outside sources and so removing the hazard of having electricity present where mixing takes place, a system wherein volumetric flow and ratio of two or more fluids can vary within the confines of a unit structure; a system wherein volumetric flow of one fluid can be varied while the system is in operation without changing the flow of the other fluid or fluids; a system wherein adjustments and operations are simple, thereby eliminating the need for highly skilled operators or mechanics; and a system wherein the "Set Points" of operation may be accomplished remotely so that the operator need not be in the room where the mixing takes place, especially during startup operations.

The names and numbers appended to the valves herein employed in the control of the regulators are, respectively, the manufacturer's name and the model number. The letters G1, G2, G3 and G4 represent pressure gauges.

It should be understood that the present disclosure is for the purpose of illustration only and includes all modifications or improvements which fall within the scope of the appended claims.

I claim:

1. A mixing valve comprising a rigid body containing a recess and inlet and outlet ports in connection therewith corresponding in number to the number of fluids to be mixed, proportioning means in the recess corresponding in number to the inlet ports, movable in a common plane relative to each other and to the inlet ports, said proportioning means defining openings so arranged with respect to the inlet ports that movement of the proportioning means relative thereto and each other changes the ratio of the fluids passing through them, and single flow control means in said recess situated between the proportioning means and the outlet ports, movable in a plane parallel to the plane of movement of the proportioning means and relative thereto in a direction at right angles to the movement of the proportioning means, defining openings corresponding in number to the outlet ports so arranged relative to the openings in the proportioning means that movement thereof relative to the proportioning means changes the total flow through the discharge ports without changing the ratio of the mixture.

2. A mixing valve according to claim 1 comprising means for moving the proportioning means and flow control means relative to each other.

3. A mixing valve according to claim 1 wherein the recess has spaced parallel walls in which are located said ports and wherein said proportioning means and said flow control means are located between said walls, the former comprising flat plates corresponding in number to the inlet ports stacked on edge in a common plane and movable transversely in the recess and the latter comprising a single flate plate movable vertically in the recess relative to the transversely movable plates.

4. A mixing valve according to claim 3 wherein the rigid body comprises a part containing a shallow opening and a rigid cover plate bolted over the opening, said part and cover plate collectively defining said recess.

5. A mixing valve according to claim 4 wherein the proportioning plates and flow control plate are confined in the recess by the cover plate.

6. A mixing valve according to claim 4 wherein there is means on the cover plate interengageable with the recess in the body to so align the cover plate with respect to the body that the inlet and outlet ports are in exact alignment.

7. A mixing valve according to claim 3 wherein when the proportioning plates are all situated at the left side of the recess and the flow control plate is situated at the top of the recess, the ratio of the fluids to each other is 1 to 1 and the volume of flow is at the maximum and wherein when the flow control plate is situated at the bottom of the recess, the flow is at a minimum.

8. A mixing valve according to claim 1 wherein the recess has spaced parallel top, bottom and side walls of rectangular configuration, said proportioning means comprise flat, substantially rectangular plates stacked against the wall containing the inlet ports for movement transversely of the recess relative to the inlet ports and to each other and said flow control means comprising a single flat, substantially rectangular plate supported between the proportioning plates and the wall containing the outlet ports for movement longitudinally of the recess relative to the openings in the proportioning plates and the outlet ports.

9. A mixing valve according to claim 8 wherein the top wall of the recess contains an opening and a rod is slidingly mounted in said opening with its inner end attached to the flow control means, said rod being operable to move the flow control means in the recess.

10. A mixing valve according to claim 1 comprising means entering the recess from outside the body connected to the respective proportioning means and to the volume control means, said means being operable from exteriorly of the mixing valve to adjust the positions of the proportioning means and the flow control means.

11. A mixing valve according to claim 1 comprising means journaled in a wall of the rigid body with portions extending into the recess into threaded engagement with the edges of the respective proportioning means and portions extending from the wall by means of which they may be rotated to adjust the position of the proportioning means.

12. The combination with a mixing valve according to claim 1 of means for supplying the fluids to be mixed to the inlet ports and for maintaining the pressure of each fluid at the inlet port of the valve at a predetermined level.

13. The combination according to claim 12 comprising means for shutting off the supply of fluids to the inlet ports in the event that the pressure at the inlet ports is not the same.

14. In combination with a mixing valve according to claim 1, conductor means for delivering the fluids to be mixed to the mixing valve, pneumatically operable means for controlling the flow of fluids to be mixed through the conductor means to the mixing valve, a circuit for supplying operating pressure to said pneumatically operable means to effect their operation and control means for controlling the supply of operating pressure to said circuit, operable when the pressure of the fluids in each of the conductor means at the upstream side of the pneumatically operable means reaches a predetermined set point to supply operating pressure to said circuit.

15. A combination according to claim 14 comprising means for rendering the control means inoperable when the pressure in either one of the conductor means fails to reach said predetermined set point.

16. In combination with a mixing valve according to claim 1, conductor means for delivering the fluids to be mixed to the mixing valve, pneumatically operable means for controlling the flow of fluids to be mixed through the conductor means to the mixing valve, a circuit for supplying operating pressure to said pneumatically operable means to effect their operation, control means for controlling the supply of operating pressure to said circuit and means for enabling and disabling said control means comprising normally open valve means set to close at a predetermined set point and operable when closed to enable the control means, means connecting the valve means to the conductor means, means for exhausting the pressure from said normally open valve means so as to maintain a pressure less than said operating pressure at said valve means and means for closing the exhaust means.

17. In combination with a mixing valve according to claim 1, conductor means for delivering the fluids to be mixed to the mixing valve, pneumatically operable means for controlling the flow of the fluids to be mixed to the inlet ports of the mixing valve and for controlling the position of the flow control means in the mixing valve and control means operable in response to a predetermined pressure in the fluid conductors upstream of the pneumatically operable means to supply operating pressure to said pneumatically operable means.

18. A combination according to claim 17 comprising means for enabling and disabling the control means comprising formally open valve means connected to the respective conductor means set to close at a predetermined pressure and operable when closed to enable the control means and means for bleeding the pressure through said normally open valve means so long as the pressure in said conductor means is below said predetermined pressure.

19. In combination with a mixing valve according to claim 1, conductor means for delivering the fluids to be mixed to the mixing valve, pneumatically operable means for controlling the flow of fluids to be mixed through the conductor means to the mixing valve, a control circuit for supplying operating pressure to said pneumatically operable means to effect their operation, a starting circuit for supplying operating pressure to said control circuit comprising a first relay, means connecting the inlet of said first relay to one of the conductor means, a second relay, means connecting the inlet of the second relay to the outlet of the first relay and means connecting the outlet of the second relay to the circuit, a normally open valve set to close at at predetermined set pressure connected to each of the relays to shift the latter from closed to open positions to permit pressure from said conductor means to flow to said control circuit, means connecting one of the normally open valve means to each of the conductor means, a needle valve for limiting the flow of pressure to each of the normally open valves to less than that required to close the normally open valve means so that as long as the pressure at said normally open valve means is less than said predetermined pressure, the normally open valves remain open and a normally open pushbutton exhaust valve through which the pressure bleeding through the normally open valve flows to the atmosphere, said normally open exhaust valve being operable to block the escaping pressure from the normally open valve means and to close the normally open valves if the pressure at said normally open valves rises to said predetermined set pressure, said relays being operable by the pressure at said normally open valve means when the latter are closed to shift to their open positions and being operable if the pressure at either of said normally open valve means falls below said set pressure to exhaust the pressure.

20. In combination with a mixing valve according to claim 1, conductor means for delivering the fluids to be mixed to the mixing valve, pneumatically operable means for controlling the flow of fluids to be mixed through the conductor means to the mixing valve, a circuit for supplying operating pressure to said pneumatically operable means and means for supplying operating pressure to said circuit comprising normally open valve means set to close at a predetermined pressure connected to each of said conductor means, a needle valve limiting the pressure to each normally open valve means to less than said pressure so that the pressure bleeds through said normally open valve means, a normally open pushbutton switch through which the pressure bleeding through said normally open valve means flows to the atmosphere, said normally open pushbutton valve constituting a starting switch and being operable when closed to prevent escape of pressure through said normally open valve means and closing of said normally open valve means in the event that the pressure at said normally open valve means rises to said predetermined pressure, a relay connected to each of said normally open valve means shiftable, by the pressure at said normally open valve means when the latter are closed, to open positions, means connecting the inlet side of one of the relays to one of the conductor means and the outlet side to the inlet side of the other relay, and means connecting the outlet side of said other relay to said circuit.

21. A combination according to claim 20 wherein if the pressure supplied to either of the normally open valve means drops below said set pressure, said relays will exhaust pressure from said conductor means.

22. In combination with a mixing valve according to claim 1, conductor means for delivering the fluids to be mixed to the mixing valve, pneumatically operable means for controlling the flow of fluids to be mixed through the conductor means to the mixing valve, a circuit for supplying operating pressure to said pneumatically operable means to effect their operation, regulator means in the control circuit for regulating the control pressure, one of said means being adapted to be manually set to cause the pneumatically operable means associated therewith to permit flow of fluids through the conductor means at a predetermined pressure and the other which is adapted to be automatically set by the pressure in the one conductor means to cause the pneumatically operable means in the other conductor means to permit flow of fluid therein at a corresponding pressure.

23. A combination according to claim 22 wherein a conductor connected at one end to the one conductor means and at the other end to the other of said regulating means effects operation of the latter to cause it to permit flow of the fluid in the other conductor means at a pressure corresponding to that in the one conductor means.

24. In combination with a mixing valve according to claim 1, conductor means for delivering the fluids to be mixed to the mixing valve, pneumatically operable means for controlling the flow of fluids to be mixed through the conductor means to the mixing valves, a circuit for supplying operating pressure to said pneumatically operable means to effect their operation, said pneumatically operable means comprising valves, a relay connected to each valve operable by the control pressure to supply the pressure in the conductor means at the upstream side of the pneumatically operable means to one side of the diaphragm, and means for supplying the control pressure to the other side of the diaphragm at the predetermind set point to cause the valve means to open when the pressure in the conductor means at the downstream side of the valve corresponds to said set pressure.

* * * * *